United States Patent
Lorenz et al.

(10) Patent No.: US 6,693,521 B2
(45) Date of Patent: Feb. 17, 2004

(54) SENSOR DEVICE FOR A MOTOR VEHICLE

(75) Inventors: Carsten Lorenz, Gechingen (DE); Michael Meyer, Altdorf (DE); Frank Schink, Grosselfingen (DE)

(73) Assignee: DaimlerChrysler AG, Stuttgart (DE)

( * ) Notice: Subject to any disclaimer, the term of this patent is extended or adjusted under 35 U.S.C. 154(b) by 145 days.

(21) Appl. No.: 10/137,652

(22) Filed: May 3, 2002

(65) Prior Publication Data

US 2002/0193937 A1 Dec. 19, 2002

(30) Foreign Application Priority Data

May 4, 2001 (DE) .......................................... 101 21 786

(51) Int. Cl.$^7$ ................................................ B60Q 1/00
(52) U.S. Cl. ................. 340/436; 73/514.01; 340/693.9; 361/679
(58) Field of Search .................................. 340/436, 635, 340/649, 686.1, 687, 693.9; 73/514.01; 701/45; 280/735, 728.2; 361/679, 807

(56) References Cited

U.S. PATENT DOCUMENTS

| | | | | |
|---|---|---|---|---|
| 3,618,117 A | * | 11/1971 | Kaiser ........................... 346/7 |
| 4,163,127 A | * | 7/1979 | Herou ..................... 200/61.47 |
| 4,409,585 A | * | 10/1983 | Rousseau .................. 340/425.5 |
| 4,972,099 A | | 11/1990 | Amano et al. ............... 307/303 |
| 5,357,141 A | * | 10/1994 | Nitschke et al. ........... 307/10.1 |
| 5,548,999 A | * | 8/1996 | Kakizaki et al. .............. 73/493 |
| 5,587,865 A | | 12/1996 | Bielig et al. ................... 361/45 |

FOREIGN PATENT DOCUMENTS

| | | |
|---|---|---|
| DE | 42 03 704 | 8/1993 |
| DE | 42 40 477 | 2/1994 |
| DE | 44 15 386 | 11/1995 |

* cited by examiner

Primary Examiner—Brent A. Swarthout
(74) Attorney, Agent, or Firm—Crowell & Moring LLP

(57) ABSTRACT

A sensor device (11) which can be attached at at least two different installation locations in a motor vehicle (10) by at least one attachment device and which has a data output. The sensor device (11) is installed at a predefined installation location in the motor vehicle (10) by attachment to at least one predefined attachment point (13), the attachment point (13) being characteristic of the installation location in such a way that the attachment to the one predefined attachment point (13) generates a predefined electrical effect, and the sensor device (11) is installed at another predefined installation location in the motor vehicle (10) by attachment to at least one other predefined attachment point (14), the attachment to the other predefined attachment point (14) generates a different predefined electrical effect. It is possible to determine the actual installation location of the sensor device (11) by sensing the generated electrical effect.

14 Claims, 2 Drawing Sheets

SENSOR DEVICE FOR A MOTOR VEHICLE

BACKGROUND AND SUMMARY OF THE INVENTION

This application claims the priority of German Application No. 101 21 786.2, filed May 4, 2001, the disclosure of which is expressly incorporated by reference herein.

The invention relates to a sensor device for a motor vehicle.

A large number of electrical devices such as switches, sensors, illumination means, actuator motors, display devices or controllers are used in motor vehicles. Some of these electrical devices are multiply installed, with the same design, in a vehicle. For example, two or four identical actuator motors of the central door locking system are installed in the vehicle doors. In the case of the door locking system, a plurality of actuating motors are actuated together so that mixing up of the cabling does not necessarily lead to problems. There are also cases in which different electrical devices, for example different plugs, are installed at the same location in the vehicle. In the case of connecting devices in the form of plugs, mixing up of the cabling is prevented by different structural embodiments. For example, plugs are used which have projections and beads, the couplings which are provided having the depressions and cutouts which fit the latter so that a plug only fits into the coupling provided for it. This also ensures that the plug is connected to the coupling with the correct orientation.

In order to prevent mix up when making an electrical connection, different structural features or design features are frequently selected for different components. For example, when a plurality of sensor devices of the same type are used, a different electrical connecting device or a different coloured marking can be provided, for each of the sensor devices which are used within the vehicle. This permits an unambiguous assignment of sensor signal to sensor device. The different sensor devices result in higher manufacturing costs, higher storage costs and higher assembly costs owing to the relatively large variety of parts.

An object of the invention is to ensure a reliable assignment of the sensor signals to precisely the sensor device from which the signals originate when a plurality of identical sensor devices are used for a motor vehicle.

The present invention relates to a sensor device provided for installation at least at two different installation locations in a motor vehicle and having a data output. According to the invention, the installation of the sensor device at a predefined installation location in the motor vehicle by means of the attachment at at least one predefined attachment point generates a predefined electrical effect. Installation of the sensor device at another predefined installation location by means of the attachment to another predefined attachment point generate a different predefined electrical effect. The attachment to a predefined attachment point characterizes the actual installation location of the sensor device which can be determined by sensing the generated electrical effect. Such an electrical effect consists, for example, of application of an electrical contact to a defined electrical potential or a defined potential difference, which can be equal to zero, and which is set between the contact and a second point. The installation location of the sensor device can be determined by the sensor device itself and/or by an evaluation device by sensing the electrical effect which is generated. For this purpose, an electrical access to the contact is necessary, which is made possible by means of a connecting line in one simple case. It is an advantage of the device according to the invention that, despite the installation of identical sensor devices at different installation locations, each sensor device can have its actual installation location assigned to it. For all the installation locations, the same sensor devices are provided so that it is possible to dispense with a mechanical differentiation between the sensor devices or with marking them or with monitoring the distinguishing features, for example different colours. Mixing up of the connecting cables or installation at the wrong installation location can thus be excluded. Identical sensor devices at identical installation locations lead to larger production numbers and at the same time to reduced storage costs.

In one refinement of the sensor device, the information relating to the installation location is used to generate the signal at the data output. In this context, the information relating to the installation location can be integrated directly into the output signal or added to said output signal as information with the result that the installation location of the sensor device can be determined and assigned to the signal by a data processing device which senses the output signal of the sensor device. The information relating to the installation location of the sensor device can in particular be output at the data output of the sensor device by means of a signal provided for that purpose. Alternatively, the information relating to the installation location of the sensor device can be taken into account in the generation of the output signal in that the data sensed by the sensor device is evaluated in accordance with the installation location of the sensor device.

In one advantageous refinement of the sensor device, the information relating to the installation location can be interrogated by an evaluation device. For this purpose it is possible to use a specially provided data line or to transfer the information via an existing data line. The advantage of this refinement is that the evaluation device can precisely interrogate the information when necessary, for example the interrogation of the installation location can take place at the start of operation and the installation location of the sensor device can subsequently be permanently assigned to each sensor device or to its sensor signal. Likewise, it is possible, after installation of the sensor device has taken place, to interrogate the installation location and assign it to the sensor device.

In a further refinement of the sensor device, an electrical component of the sensor device and the vehicle earth are connected by means of the installation of the sensor device at a first predefined installation location. However, this electrical connection is not brought about at a second predefined installation location because the connection is attached to a second attachment point and the electrical connection only comes about as a result of the attachment to the first attachment point. An electrical connection to the vehicle earth as a distinguishing feature has the advantage that it is easy to carry out and easy to check. Such an electrical connection to the vehicle earth can be sensed and/or evaluated by the sensor device but it can also easily be transmitted by means of a single line to another evaluation device and sensed by it.

In a further refinement of the sensor device, the electrical connection between the vehicle earth and the electrical component of the sensor device is brought about by the attachment means which is used to attach the sensor device to the vehicle. This ensures that the electrical connection to the vehicle earth exists only if the sensor device is attached to the predefined installation location in the vehicle according to specifications. Therefore, inadvertent electrical connection to the vehicle earth, and thus an incorrect assignment of the sensor device to an installation location is prevented. This applies in particular if the attachment means is electrically conductive and an electrical connection between vehicle earth and sensor device is brought about by an attachment means which itself acts as an electrical connection means. Alternatively, the electrically conductive attachment means can bring about a connection between two attachment points. Such a connection can be easily monitored by the sensor device or by an evaluation device and sensed in the form of a short-circuit. Furthermore, a combination of an electrical connection to the vehicle earth and an electrical connection between two attachment points may be provided. This is advantageous if more than two installation locations for the sensor device are provided in the vehicle and are to be distinguished from one another.

In further refinements of the sensor device, the attachment points are drilled holes in the housing of the sensor device. The attachment means are preferably in the form of screws, screw nuts or stud bolts as these attachment means are cost-effective, easy to handle and if necessary obtainable in both electrically insulating and electrically conductive forms.

During the sensing of the installation location of the sensor device it is in particular interesting to sense whether the sensor device is installed on the right or on the left of the vehicle as the vehicle design has, to a certain extent, axial symmetry along the longitudinal axis of the vehicle, in particular when equipped with sensors.

In one particular advantageous refinement of the sensor device, two drilled holes for attaching this device to the vehicle are provided on it, one of the two drilled holes being provided for attaching the sensor device to the left-hand side of the vehicle and the other of the two drilled holes being provided for attachment to the right-hand side of the vehicle. The drilled holes on the sensor device are adapted to the installation location in the vehicle in such a way that only the predefined drilled hole can respectively be used to attach the sensor device. For example, the installation location of the vehicle is formed by a different pattern of holes in such a way that the sensor device can only be installed in a single way at each installation location. This single method of installation leads to the desired electrical effect at the sensor device, which characterizes the installation location. It is an advantage of this refinement that the sensor device, like previous sensor devices, can be installed easily in the vehicle in an automated fashion using the same attachment means. Different attachment means have to be selected only at different installation locations. This can occur, for example, as a result of the selection of the pattern of holes in or at the installation location in the vehicle, and is possible with particularly low additional outlay both when manufacturing sensors and when assembling vehicles.

In one alternative embodiment of the sensor device, three drilled holes for attaching the sensor device to the vehicle are provided on said sensor device, two of the three drilled holes being provided for attaching the sensor device to the vehicle at one installation location and at least the third drilled hole being provided for attaching said sensor device to another installation location. The drilled holes of the sensor device are in turn adapted to the installation location in the vehicle in such a way that in each case only the predefined drilled holes can be used to attach the sensor device, and only the predefined electrical effects can thus be achieved in the sensor device so that the installation location can be determined unambiguously. Sensor devices with four or more attachment points can be correspondingly prepared, the number of attachment points which bring about a different electrical effect at the different installation locations predefining the number of different installation locations.

The sensor device may be, for example, a decentralized acceleration sensor, which is referred to as a satellite sensor whose signal is used for triggering control of vehicle occupant protection systems. Such sensors are installed as exported sensors or satellite sensors in the vehicle in duplicate, quadruplicate or to an even higher number, the correct cabling in the vehicle bringing about the assignment of the sensor signals to the sensors or their installation locations. In this context, a fault in the cable harness, for example when connecting the sensors, results in the possibility of the sensor signals being incorrectly interpreted in the event of an accident and leading to an incorrect triggering decision of a vehicle occupant protection means. With such acceleration sensors, reliable assignment of the sensors to the installation locations is absolutely necessary because they are components which are critical for safety.

Instead of acceleration sensors, it is, of course, also possible to use approximation sensors, deformation sensors or crash contact switches as the sensor devices according to the invention.

Two advantageous embodiments of the device according to the invention are described below in more detail with reference to the drawing. In said drawing, in each case in a schematic view:

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
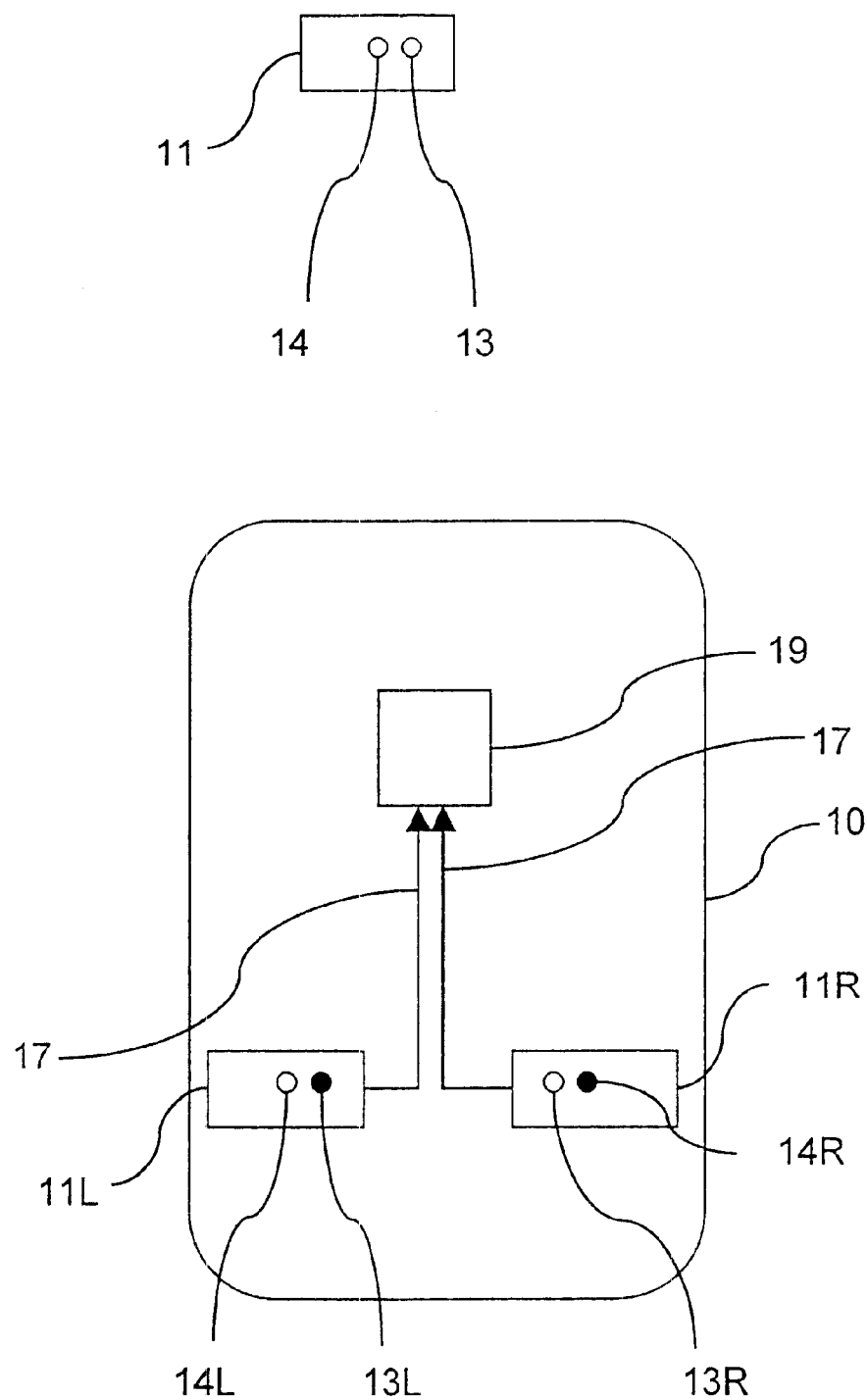
FIG. 1 shows an embodiment of the sensor device according to the invention with two attachment points and its installation in a motor vehicle.

FIG. 1 shows an embodiment of the sensor device 11 according to the invention with two attachment points 13 and 14 and a vehicle 10 with two identical sensor devices 11 at different installation locations. The one sensor device 11L has the left-hand installation location and the other 11R has the right-hand installation location in the vehicle 10. The sensor device 11 according to the invention has two attachment points 13, 14 in the form of drilled holes. The left-hand sensor devices 11L are attached to the vehicle 10 through one of the two drilled holes 13L. The right-hand sensor device 11R is rotated through 180° with respect to the left-hand sensor device 11L for installation and attached by means of the other of the two drilled holes 14R so that the two identical sensor devices 11L and 11R are arranged mirror-inverted in the vehicle 10. The attachment points 13L and 14R to which the sensor devices 11L and 11R are attached in the vehicle 10 are characterized by a shaded drilled hole. The cable connections for the signal lines 17 of the two sensor devices 11L and 11R both point to the centre of the vehicle. On the basis of a pattern of holes in the vehicle, which is provided for the attachment of a sensor device 11, the sensor device 11L can be attached on the left-hand side of the vehicle only by means of the pattern 13L of holes which is facing the cable connection, whereas the sensor device 11R can be attached on the right-hand side of the vehicle only by means of the pattern 14R of holes facing away from the cable connection. The drilled hole 13 facing the cable connection is then provided with a contact point, for example. If the sensor device 11 is attached to the vehicle body with a conductive screw by means of the drilled hole 13, an electrical contact is produced between the vehicle earth at the bodywork via the screw to the contact point. At this contact point, it is thus possible to determine at which drilled hole the sensor device is attached, that is to say on which side of the vehicle the sensor device 11 is installed in the vehicle 10. This information can be sensed in the sensor device 11 and evaluated or transmitted to an evaluation device 19 by means of a signal.

Alternatively, an additional line can electrically connect, as part of the signal line 17, the contact point to an evaluation device 19 so that the installation location of the sensor device 11 can be determined and assigned to the respective sensor signal by checking the line for an earth connection. The advantage of this alternative is that the sensor signal does not need to be changed as the installation location is transmitted to the evaluation device by means of the additional line provided for this purpose. If the installation location is to be additionally inferred from the sensor signal, the information relating to the installation location of a sensor is redundantly present at the evaluation device, which is advantageous in particular in the case of sensor devices which are provided for the safety of vehicle occupants.

Figure 2:
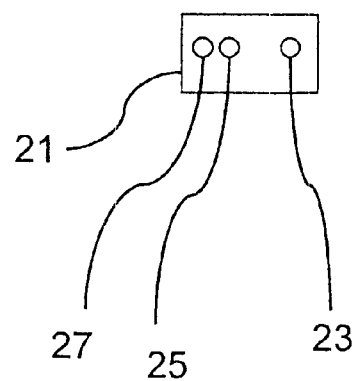
FIG. 2 shows an embodiment of the sensor device according to the invention with three attachment points and its installation in a vehicle.
Figure 2:
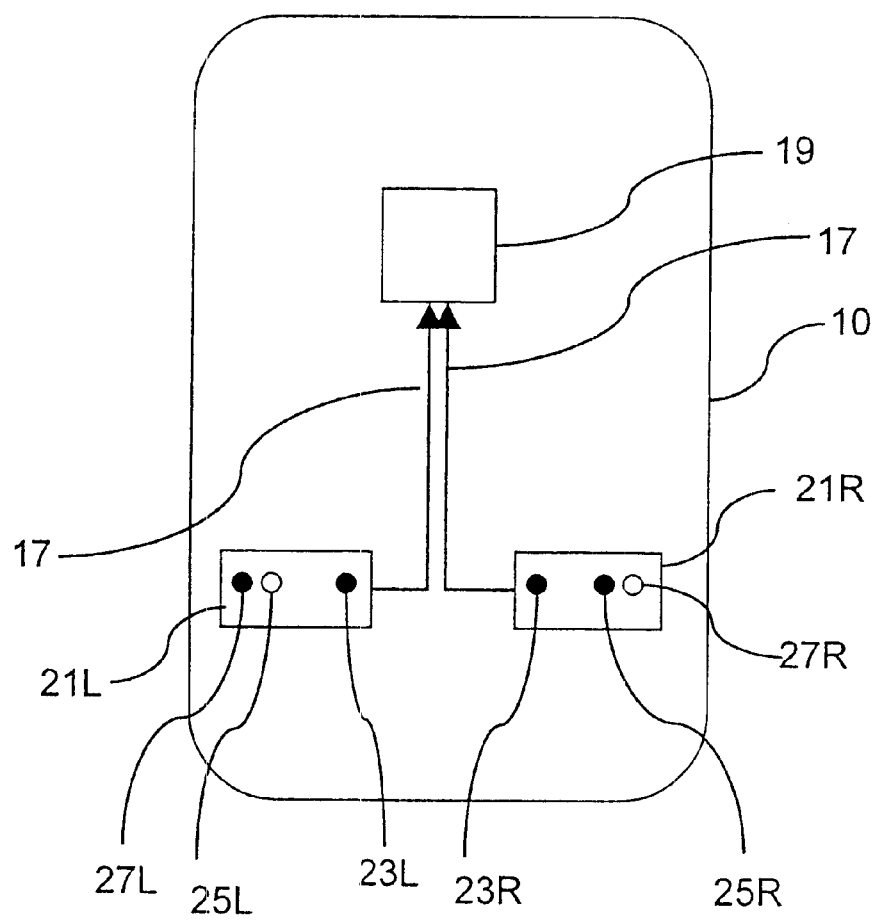

FIG. 2 shows a second embodiment of the sensor device 21 according to the invention with three attachment points and a vehicle 10 with two identical sensor devices 21 at different installation locations. The one sensor device 21L is installed on the left in the vehicle 10 and the other sensor device 21R is installed on the right in the vehicle 10. The sensor device 21 according to the invention has three attachment points 23, 25, 27 in the form of drilled holes. The sensor devices 21 are attached to the vehicle 10 by means of two of the drilled holes 23, 25, 27. The left-hand sensor device 21L is attached by means of the drilled holes 23L and 27L. The right-hand sensor device 21R is rotated through 180° for installation and attached by means of the two drilled holes 23R and 25R so that the two sensor devices 21L and 21R are arranged mirror-inverted in the vehicle 10. The cable connection for the signal line 17 of the sensor device 21 points towards the centre of the vehicle on both sensor devices 21L and 21R. Owing to the pattern of holes which is provided in the vehicle 10, the sensor device 21 can be attached on the left-hand side of the vehicle 10 only by means of the drilled holes 23 and 27, whereas the sensor device 21 can be attached on the right-hand side of the vehicle 10 only by means of the drilled holes 23 and 25. The drilled hole 25 is provided, for example, with a contact point and the installation location of the sensor device 21 can be determined in accordance with the description in FIG. 1.

If an alternative configuration of the sensor device 21 is attached to a component of the vehicle which is not connected to the vehicle earth or which is non-conductive, the installation location can be determined as follows: the drilled holes 23 and 25 are each provided with contact points. If an electrically conductive attachment means, for example a metallic screw, is respectively provided in the two drilled holes 23 and 25, an electrical connection is produced between the two contact points by means, for example, of a washer which makes contact with a conductor track, it being possible for said electrical connection to be sensed by the sensor device 21 or an evaluation device 19. If the sensor device 21 is, on the other hand, attached by means of the two drilled holes 23 and 27, this contact is not produced.

As an alternative to a direct electrical effect of the attachment means, they can also act mechanically, for example in that they activate a switch in the sensor device and in doing so indirectly generate an electrical effect which characterizes the installation location of the sensor device.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A sensor device structured to be installed in one of at least two predefined different installation locations by at least one attachment means wherein said at least one attachment means cooperates with said sensor device to provide a data output, said sensor device comprising:
    at least one attachment point providing a first data output indicating attachment to a first one of said at least two predefined installation locations when said at least one first attachment point contacts one of said at least one attachment means;
    at least one second attachment point providing a second data output indicating attachment to a second one of said at least two predefined installation locations when said at least one second attachment point contacts one of said at least two attachment means.

2. A sensor device according to claim 1, wherein an actual installation location of the sensor device is output as the data output of the sensor device by means of a signal.

3. The sensor device according to claims 1, wherein an actual installation location of the sensor device is determined by an evaluation device using signal interrogation.

4. The sensor device claim 1, wherein an installation location of the sensor device is in a motor vehicle.

5. The sensor device according to claim 4, wherein the installation location of the sensor device in the motor vehicle is a function of an electrical connection between the vehicle ground and an electrical component of the sensor device.

6. The sensor device according to claim 1, wherein each of the attachment means provides an electrical connection between ground and an electrical component of the sensor device.

7. The sensor device according to claim 1, wherein an installation location of the sensor device is provided by an electrical connection between at least two attachment points.

8. The sensor device according to claim 7, wherein the attachment means is electrically conductive and produces said electrical connection.

9. The sensor device according to claim 1, wherein the attachment points are drilled holes in a housing of the sensor device.

10. The sensor device according to claim 9, wherein there are two drilled holes for attaching the sensor device to the vehicle which are provided on the sensor device and, in order to attach the sensor device to the vehicle, one of the two drilled holes is provided at one installation location and the other of the two drilled holes is provided at a second installation location with the drilled holes on the sensor device being adapted to the installation locations in such a way that only a drilled hole which is respectively provided for a particular installation location can be used to attach the sensor device at each of said installation locations.

11. The sensor device according to claim 9, wherein there are three drilled holes provided on the sensor device and, in order to attach the sensor device, at least a first one of the three drilled holes is provided at one installation location and, in order to attach the sensor device to another installation location, at least another one of the three drilled holes, other than the first drilled hole, is provided, wherein the drilled holes on the sensor device are adapted to the installation location in such a way that only the drilled holes which are respectively provided for an installation location can be used to attach the sensor device at each installation location.

12. The sensor device according to claim 6, wherein an electrical connection between the earth and the electrical component provides a signal checked by an evaluation device to determine the installation location of the sensor device.

13. The sensor device according to claim 1, wherein the output data provides a triggering control of a vehicle occupant protection system.

14. The sensor device according to claim 1, when the output data provides for sensing an acceleration or deformation.

* * * * *